July 1, 1969 H. HAAS 3,453,381

MAGNETIC RECORDING DEVICE FOR RECORDING AND REPRODUCING OF HIGH-FREQUENCY SIGNALS

Original Filed June 29, 1962

Inventor:
Helmut Haas
by Michael J. Striker
Attorney

United States Patent Office 3,453,381

Patented July 1, 1969

3,453,381
MAGNETIC RECORDING DEVICE FOR RECORDING AND REPRODUCING OF HIGH-FREQUENCY SIGNALS

Helmut Haas, Kronach, Upper Franconia, Germany, assignor to Lowe Opta G.m.b.H., Berlin-Steglitz, U.S. Sector of Berlin, Germany Continuation of application Ser. No. 207,456, June 29, 1962. This application Jan. 14, 1966, Ser. No. 520,785
Claims priority, application Germany, July 4, 1961, L 39,437
Int. Cl. H04n 5/78; G11b 5/00
U.S. Cl. 178—6.6 10 Claims

ABSTRACT OF THE DISCLOSURE

In an arrangement for recording and reproducing magnetic sound and video signals an elongated flexible record carrier is advanced in predetermined direction by take-up means from supply means, at least the take-up means being driven by driving means. A sound recording or reproducing arrangement is located intermediate the supply and take-up means. A video recording or reproducing arrangement is located intermediate the sound recording or producing arrangement and the take-up means. Carrier-driving means is located between the sound arrangement and the video arrangement so that a carrier which is pulled through the sound arrangement by the carrier-driving means and guided towards the video arrangement and is then transported through the video arrangement by being pulled by the carrier take-up means driven by the driving means, is advanced at a speed during passage through the sound arrangement which depends solely on the driving means and is not effected by possible speed variations of the carrier during and after passage through the video arrangement.

Figure 1:
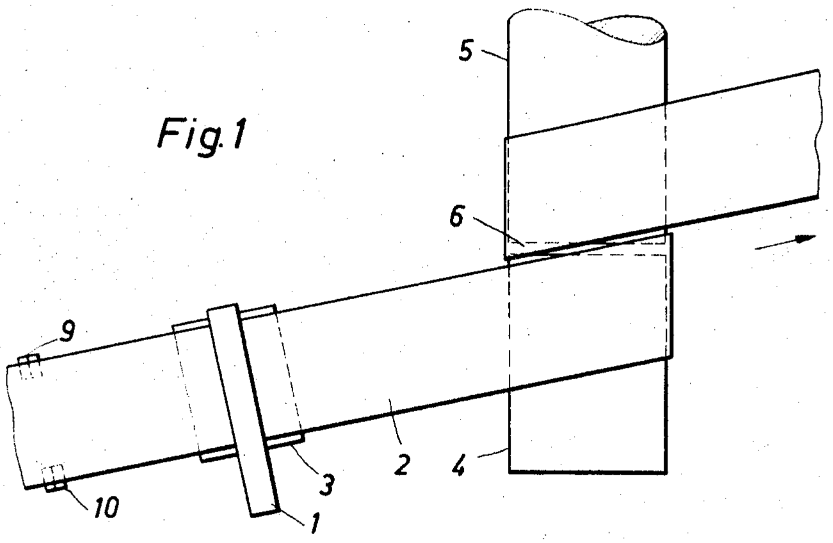

The present application is a continuation of my application, Ser. No. 207,456, filed on June 29, 1962, entitled "Driving Device for Magnetic Recording and Reproducing of High-Frequency Signals," and now abandoned.

The invention relates to a driving device for magnetic recording and reproducing of video signals. It is a principal object of the invention to provide means for producing good synchronism properties in a process needing high speed for recording or scanning. This is achieved by utilizing the differentials between the relative speeds of a rotating magnetic recording head and a magnetic tape medium led past this at a speed usual in sound tape-recording apparatus.

It is another object of the invention to provide an improved means of driving a record carrier such as is used in recording of high-frequency signals.

According to one known process a magnetic recording-head carrier fitted with one or several magnetic recording heads rotates between two fixed cylinders which abut axially on each other in such a manner that a slight gap is defined between them. In the region of this gap of the two cylinder surfaces a magnetic tape runs obliquely to the cylinder axis on to the cylinder surface and encloses the cylinders in a helical loop. In the known arrangement the magnetic tape is moved by driving means which are arranged behind the cylinders referring to the direction of run of the magnetic tape, i.e. it is drawn over the cylinders.

As a result of the large looping angle (about 360°), which causes the friction between the pair of cylinders and the magnetic tape to assume relatively high values, slight alterations of the tension on the magnetic tape before the same reaches the pair of cylinders produce great fluctuation of stress on the magnetic tape drive. In the same way slight alterations in the friction coefficient between the magnetic tape and the cylinder surfaces cause considerable changes in the tension on the magnetic tape or in the stress on the magnetic tape drive. Finally the magnetic recording-head carrier which rotates within the cylinders excites longitudinal vibrations in the magnetic tape, thus causing uneven running of the tape.

All alterations in the tape tension and irregularities in tape run cause distortions in the record impressed by the magnetic heads which conventionally are fixedly arranged behind the cylinders in the direction of run of the magnetic tape for recording and reproducing one or several synchronising and/or sound tracks. Faultily recorded synchronising signals inevitably cause errors of synchonism in subsequent reproduction. Distorted recording of the synchronising signals has a particularly strong effect when the magnetic tape is to be played back on another reproducing apparatus, because in this case the different tolerances in manufacture of the apparatus used for the reproduction as against those in the original recording apparatus cause additional deterioration of synchronism.

It is obvious that such faulty recordings may in certain circumstances render proper television recording and reproduction impossible.

Furthermore, a device for recording and reproducing high frequency signals is known wherein a magnetic tape, coming from a supply reel, is pushed by driving rollers over a rotating guiding cylinder and after this pulled by other driving rollers and wound up by a take-up reel. In such a device the rotating guiding cylinder has no result in friction difficulties between cylinder and tape surface. However, two complete tape driving means with constant speeds are necessary and if the speeds of all rollers are not exactly synchronised difficulties will appear. If, for example, the roller positioned between the guiding cylinder and the take-up reel runs somewhat faster than the other driving rollers the power of traction acting upon the magnetic tape will increase inadmissibly high. Thereby the recorded synchronising signals will cause errors of synchronism in playing back the tape.

To counter the faults described, the invention provides for the tape driving means to be fitted, seen with reference to the direction of movement of the tape, ahead of the pair of cylinders. In such a driving arrangement the magnetic tape, or more accurately, that portion of it which is ahead of the cylinders, will therefore be more or less pushed toward the pair of cylinders, while beyond this point only a winding-in or take-up device is required to prevent undue looping. This eliminates the influence of the looping angle on the tape tension and driving means.

At the same time the vibrations which affect the magnetic tape and the fixed magnetic sound heads, and which are caused by the rotating video heads can be correctly neutralized mechanically if the fixed heads are not fitted between the pair of cylinders and the take-up in the conventional way but instead are arranged ahead of the driving device, the driving device consisting e.g. of a capstan and a pressure roller assuring absolutely constant running of the magnetic tape in the range of the fixed heads.

It should be understood that whenever reference is made herein to "sound" heads or "sound recording or reproducing heads," this is always intended to include also synchronizing heads for independent sound recordings or reproduction arrangements. In other words, any arrangement is included in this reference which singly or in combination produces signals capable of influencing sound recording and reproduction in any manner including synchronization thereof.

Figure 2:
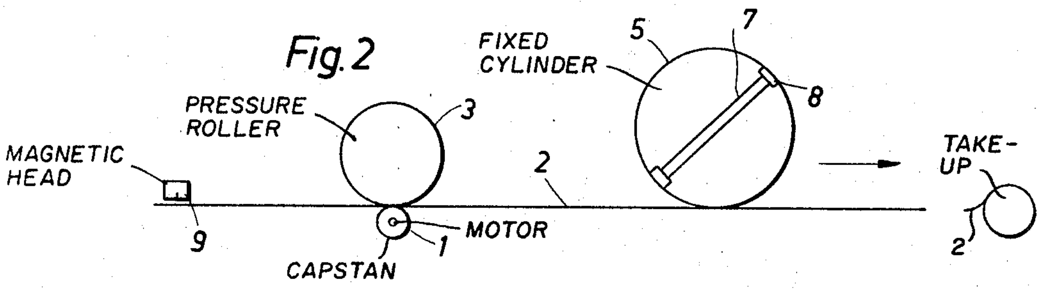

In the accompanying drawings which are merely a schematic indication of an examplary design of the invention, FIGURE 1 represents a schematic view of an embodiment of the invention; and FIGURE 2 is a top plan view of the embodiment of FIG. 1, omitting one of the pair of cylinders so as to show the video-head carrier.

According to FIGURE 1 a driving device for a magnetic recording and reproducing process for high-frequency signals consists of a capstan 1 over which a magnetic tape 2 passes loosely. By pressure from a pressure roller 3 on capstan 1 the magnetic tape is driven according to the direction of rotation and speed of the capstan, which is driven by a motor via a conventional gearing system not repersented in the drawing. In FIGURE 1 the direction of run of the magnetic tape is shown by the arrow. The magnetic tape after leaving the capstan runs obliquely onto two axially aligned, but slightly spaced fixed hollow cylinders 4, 5 and is wrapped around said cylinders in a helical loop. In the gap 6 between the two cylinders a magnetic recording-head carrier 7 (FIG. 2) rotates, bearing e.g. on each end magnetic video recording and/or reproducing heads 8. The operating gaps of magnetic heads 8 describe a circular path within the cylinders when the carrier rotates. After leaving the cylinders, the tape is wound up by a take-up reel only with a tension which is just sufficient to prevent looping, but will not cause pulling on that portion of the tape which at any given moment is about to contact the surface of the cylinders 4, 5 but has not yet done so.

Upstream of the driving device magnetic heads 9, 10 are fixedly arranged, which record synchronizing and sound tracks to be applied to the borders of the magnetic tape. In order to erase an earlier made tape recording it is appropriate to provide upstream of the recording heads 9, 10 a further magnetic erasing head which covers the entire width of the magnetic tape.

As, in accordance with the invention, the driving means consisting of capstan and pressure roller is fitted upstream of the cylinders 4, 5, the irregular effects of the looping angle and the resulting frictional forces which are inevitably generated between the cylinder surfaces and the magnetic tape during passage of the latter, remain without influence on the recording of the synchronizing signals and sound impulses, so that contrary to the hitherto known devices optimal synchronism is achievable between recording and reproduction.

I claim:

1. An arrangement for recording and reproducing magnetic sound and video signals comprising supply means for supplying elongated flexible record carrier strip; carrier take-up means for taking up said carrier arranged spaced, from said supply means; driving means for driving at least said take-up means; a sound recording or reproducing arrangement arranged between said supply means and said take-up means; a video recording or reproducing arrangement arranged between said sound recording or reproducing arrangement and said video recording or reproducing arrangement whereby a carrier is pulled through said sound recording or reproducing arrangement by said carrier driving means and guided towards said video recording or reproducing arrangement and then transported through said video recording or reproducing arrangement by being pulled by said carrier take-up means driven by said driving means for said carrier take-up means, so that the speed of said carrier during passage through said sound recording or reproducing arrangement is dependent solely on said driving means and not affected by possible speed variations of said carrier during or after passage through said video arrangement.

2. An arrangeemnt as defined in claim 1, wherein said video recording or reproducing arrangement comprises a hollow cylindrical housing having an axis extending normal to the path of said carrier and comprising two coaxial portions arranged with slight axial spacing so as to define a gap therebetween, and a video recording or reproducing head rotatably arranged with said housing in alignment with said slot.

3. An arrangement as defined in claim 2, wherein said carrier is looped about said housing in a helical path and overlying said gap.

4. An arrangement as defined in claim 3, wherein said sound recording or reproducing arrangement comprises at least one sound recording or reproducing head and at least one synchronizing signal head.

5. An arrangement as defined in claim 3, wherein said sound recording or reproducing arrangement comprises at least one sound recording or reproducing head and at least one synchronizing signal head, and wherein said driving means comprises a driven roller arranged on one side of said carrier and a pressure roller arranged on the other side of said carrier, said rollers being adapted to engage said carrier between them for advancing the same towards said video recording or reproducing arrangement.

6. An arrangement as defined in claim 5, wherein the pull exerted by said driving means for said take-up means is adequate for taking up said carrier after the same has been transported to said video recording or reproducing arrangement by said driving means arranged between said sound recording or reproducing arrangement and said video recording or reproducing arrangement.

7. An arrangement as defined in claim 5, wherein said drive roller is a capstan, and said pressure roller selectively deflects said carrier into engagement with said capstan.

8. An arrangement as defined in claim 7, and further comprising motor means for both of said drive means.

9. An arrangement as defined in claim 8, wherein said motor means is a single motor operatively connected to both of said drive means.

10. An arrangement as defined in claim 9, wherein said sound recording or reproducing head and said synchronizing signal head are stationary.

References Cited

UNITED STATES PATENTS 2,773,120 12/1956 Masterson.
2,919,314 12/1959 Holt.
3,213,204 10/1965 Okamura.

ROBERT L. GRIFFIN, *Primary Examiner.*
HOWARD W. BRITTON, *Assistant Examiner.*

U.S. Cl. X.R.

179—100.2

PO-1050
(5/69)

UNITED STATES PATENT OFFICE
CERTIFICATE OF CORRECTION

Patent No. 3,453,381 Dated July 1, 1969

Inventor(s) Helmut Haas

It is certified that error appears in the above-identified patent and that said Letters Patent are hereby corrected as shown below:

Column 3, line 58, is corrected to read as follows:

"cording or reproducing arrangement and said take-up means; and carrier driving means arranged between said sound recording or reproducing arrangement and said video re-"

Signed and sealed this 13th day of April 1971.

(SEAL)
Attest:

EDWARD M.FLETCHER,JR.
Attesting Officer

WILLIAM E. SCHUYLER, JR.
Commissioner of Patents